Figure 1:
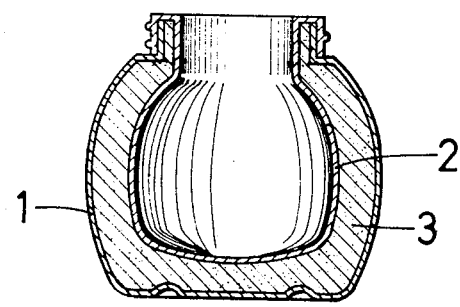

United States Patent
Nagata

[11] 3,752,351
[45] Aug. 14, 1973

[54] HIGH IMPACT RESISTANT DOUBLE-WALLED CONTAINER

[76] Inventor: Kanjiro Nagata, 9-chome 1 Banchi Yasunaka-cho Yao-chi, Osaka, Japan

[22] Filed: Jan. 27, 1971

[21] Appl. No.: 110,109

Related U.S. Application Data
[63] Continuation-in-part of Ser. No. 63,917, Aug. 14, 1970.

[30] Foreign Application Priority Data
Sept. 6, 1969   Japan.................................. 44/70781

[52] U.S. Cl................ 220/9 R, 161/139, 215/12 R, 215/13 R
[51] Int. Cl............................................ B65d 25/18
[58] Field of Search............................ 220/9 R, 9 F; 215/12 R, 13 R; 161/139, 41–55

[56] References Cited
UNITED STATES PATENTS

| | | | |
|---|---|---|---|
| 128,725 | 7/1872 | Harrington............................ | 220/9 R |
| 165,357 | 7/1875 | Mix....................................... | 220/9 R |
| 858,583 | 7/1907 | Doan...................................... | 220/9 R |
| 1,298,202 | 3/1919 | Hall et al. ............................ | 220/9 R |
| 1,383,838 | 7/1921 | Mrazek................................ | 215/12 R X |
| 1,901,556 | 3/1933 | Gottschalk............................ | 220/9 R |
| 2,711,766 | 6/1955 | Archer et al..................... | 220/9 R X |
| 3,096,897 | 7/1963 | Hansen............................. | 220/9 R X |
| 3,120,570 | 2/1964 | Kennedy et al. ..................... | 220/9 F |

FOREIGN PATENTS OR APPLICATIONS
904,650   8/1962   Great Britain...................... 220/9 R Primary Examiner—Samuel B. Rothberg
Assistant Examiner—James R. Garrett
Attorney—Bacon & Thomas

[57]   ABSTRACT

Plastic double-walled containers having a high impact-resistance wherein the space between the outer and inner walls is filled with a hardened gypsum cement and resin combination.

2 Claims, 2 Drawing Figures

Patented Aug. 14, 1973

3,752,351

INVENTOR.
Kanjiro Nagata
BY
Bacon & Thomas
ATTORNEYS

HIGH IMPACT RESISTANT DOUBLE-WALLED CONTAINER

CROSS-REFERENCE TO RELATED APPLICATION

This is a continuation-in-part of application Ser. No. 63,917, filed Aug. 14, 1970.

The present invention relates to various size containers from plastic resin materials, which can be used for a variety of purposes, such as for example as cosmetic bottles, perfume phials, bath tubs and the like.

Conventional types of containers made from thermoplastic resin materials, are generally light in weight and not as thick and heavy as the common types of containers made from glass. Furthermore, plastic containers manufactured by a conventional method are generally not sufficiently sturdy and impact-resistant to prevent them from being crushed by exterior impacts.

The present invention is concerned with a plastic double-walled container devoid of the above-mentioned deficiencies.

It is therefore one of the main objects of the present invention to provide a plastic double-walled container that is simple to manufacture and yet surpassingly superior in impact-resistance to similar plastic containers that are manufactured by conventional methods.

Further, it is another object of the present invention to provide a plastic double-walled container that not only can be easily molded to present a desired aesthetic, delicate appearance of a quality comparable to priceless crystal glass, but can also be manufactured so as to be as thick and heavy as high-grade containers that are made from crystal glass material.

One method of preparing the novel containers of the present invention involves enclosing a mass of filler or filling material in the space between the outer and inner walls of a plastic double-walled container body while in a soft, flowable state and allowing it to harden in situ. Alternatively, the containers can be prepared by placing the suitable material in a suitable form or mold, solidifying it, removing it, and then laminating or coating the entire outer surface of the thus solidified filler with a plastic resin material.

Figure 2:
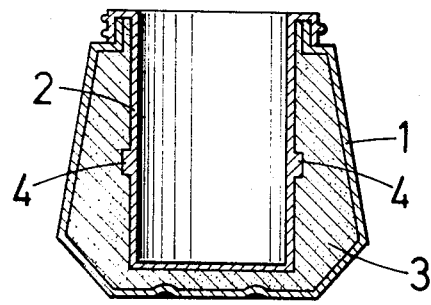

Containers of the present invention manufactured by each of the alternative methods are illustrated in the accompanying drawings, in which FIG. 1 is a cross-sectional view showing a plastic container made by coating or laminating a previously shaped and solidified filler, and FIG. 2 is a similar view showing such a container in which the outer wall was shaped by blow molding and the inner wall was shaped by injection molding and the container was made by enclosing a mass of filter material between the walls.

The preferred filler or filling material of the present invention is either a calcined gypsum cement, such as plaster of paris ($CaSO_4 \cdot \frac{1}{2} H_2O$) or such a cement in combination with a resin which may be expressed by the formula $CaSO_4 \cdot X \cdot \frac{1}{2} H_2O$ in which X represents the resin. I have found through many experiments and investigations that when mixed with a small quantity of water such cements immediately begin to set and radiate heat, finally solidifying and at the same time slightly expanding in volume.

Now setting forth in detail the embodiments of the invention with reference to the accompanying drawings, reference numerals 1 and 2 designate an outer wall and an inner wall respectively of the container according to the present invention. These outer and inner walls are composed of a conventional thermoplastic resin material, such as polyvinyl chloride. Reference numeral 3 designates a filler comprising a body of hardened plaster of paris or a resin-plaster of paris combination.

According to one method of manufacturing the double-walled container of the invention, filler material, which may comprise either of the substances mentioned earlier, is mixed with water to form a soft, flowable mass. A quantity of the soft material which will fill to overflowing the space between the double walls of the container to be produced is put in the larger-sized plastic shell which is to constitute the outer wall 1 of the container. Then, prior to setting of the filler material, there is inserted into the larger-sized shell, a smaller sized plastic shell which is to constitute the inner wall 2 of the finished container, with the two arranged symmetrically as shown in FIGS. 1 and 2. This displaces the still soft and flowable filler material and causes it to completely fill the space between the walls of the container, the surplus being forced out leaving the remaining filler airtightly sealed between the two walls. The filler material then rapidly sets into a hardened body.

According to another method, a soft mass of the filler material mixed with water is enclosed in a mold and solidified. The solidified filler is then taken out of the mold, and the entire outer surface thereof is laminated or coated with a plastic to form outer wall 1 and the inner wall 2.

The double-walled container of the present invention therefore can be produced by either of the above-mentioned two methods. Furthermore, the outer wall 1 and the inner wall 2 can be more tightly incorporated with the plaster filler 3 by providing projecting portions 4 of desired shapes, for example, around the outer periphery of the inner wall 2 and at the bottom of the outer wall 1.

As has been mentioned, the present invention provides a plastic double-walled container wherein the two walls are air-tightly sealed to the filling material. Therefore, it can be seen that the method of preparing the containers of the present invention has the advantage that the plaster filler 3 is tightly sealed between the outer wall 1 and the inner wall 2 whereby it serves very efficiently to afford a container body having a high impact-resistance.

The plastic double-walled container manufactured according to the present invention is about three or four times heavier than a conventional plastic container having a space between the walls. On the other hand, it is about 40 percent lighter than a common glass container of the same thickness. Accordingly, such containers are ideally suited for use as cosmetic bottles.

Furthermore, the filler of the present invention is in very intimate contact with the outer and inner plastic walls because of the expansion which the filler undergoes when it solidifies. The result is a container body having walls of greath strength.

Because the outer wall 1 and the inner wall 2 are integrally sealed to the filler 3 forming a container body of high impact-resistance, it is not necessary to have excessively thick walls in order to achieve this objective, as would be required if the filler were omitted. Consequently it is quite feasible to make the walls of any preferred shapes by blow molding, which is normally applicable only for thin plastic or glass manufacture.

Thus, in accordance with the present invention, there is no limit to the container appearances, shapes and forms which can be obtained. Being made from a plastic resin material, the containers of the present invention can be manufactured having delicate colors ordinarily peculiar to plastics, but which could not be obtained using glass.

When a cement-resin combination is employed as the filler material 3, it has been found that after solidification, it can withstand pressures of up to 700 kg. per square centimeter. This property makes the containers of the present invention ideally suited for use as liquid aersol containers which are required to withstand pressures of only 15 kg. per square centimeter.

In summary, it is clearly evident that the plastic double-walled containers of the present invention are ideally suited for use as cosmetic bottles or the like since they are easier to handle and afford greater possibilities in the way of versatile moldings and various color combinations than could be obtained with similar plastic cosmetic bottles made in the conventional manner.

Since the containers of this invention have both their outer and inner walls firmly attached to the filling material to provide an air-tight seal therewith, they do not give a hollow sound suggestive of inferior quality when struck, nor do they collapse as do the conventional plastic containers. Thus the herein described containers create an image of a higher quality cosmetic bottle. Moreover, even if they are struck with a hard object or dropped, there is no danger of significant damage occurring to them. Last but not least, it is to be pointed out that by employing the method described herein, it is easy to manufacture the containers on a large scale and at a low cost using a conveyor system, while obtaining high grade plastic containers of desired shapes and colors having a high impact-resistance.

Although the present invention has been described with reference to preferred embodiments, it is to be understood that it is not to be so limited since changes and modifications may be made therein which are within the ully intended scope and spirit of this invention as hereinafter claimed.

What is claimed is:

1. A double-walled container having a high impact resistance, comprising an outer shell of plastics material, an inner shell of plastics material spaced from said outer shell, and a body of hardened gypsum cement combined with a plastics resin completely filling the space between said shells.

2. A container as claimed in claim 1 in which said gypsum cement is plaster of paris.

* * * * *